United States Patent
Decarreau

(10) Patent No.: US 11,419,023 B2
(45) Date of Patent: Aug. 16, 2022

(54) APPARATUS AND METHOD FOR OPTIMIZATION OF CONDITIONAL HANDOVER CONFIRMATION

(71) Applicant: Nokia Technologies Oy, Espoo (FI)

(72) Inventor: Guillaume Decarreau, Munich (DE)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 17/052,727

(22) PCT Filed: May 9, 2019

(86) PCT No.: PCT/IB2019/053834
§ 371 (c)(1),
(2) Date: Nov. 3, 2020

(87) PCT Pub. No.: WO2019/215666
PCT Pub. Date: Nov. 14, 2019

(65) Prior Publication Data
US 2021/0235341 A1    Jul. 29, 2021

Related U.S. Application Data

(60) Provisional application No. 62/669,465, filed on May 10, 2018.

(51) Int. Cl.
*H04W 4/00* (2018.01)
*H04W 36/00* (2009.01)
*H04W 36/30* (2009.01)

(52) U.S. Cl.
CPC ........... *H04W 36/00837* (2018.08); *H04W 36/0058* (2018.08); *H04W 36/0094* (2013.01); *H04W 36/30* (2013.01)

(58) Field of Classification Search
None
See application file for complete search history.

(56) References Cited

U.S. PATENT DOCUMENTS

| 2015/0079991 A1 | 3/2015 | Koskinen et al. |
| 2015/0358864 A1 | 12/2015 | Park et al. |
| 2016/0174124 A1 | 6/2016 | Basu Mallick et al. |

(Continued)

FOREIGN PATENT DOCUMENTS

| WO | 2018/156696 A1 | 8/2018 |
| WO | 2018/197097 A1 | 11/2018 |
| WO | 2019/096396 A1 | 5/2019 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.1.0, Mar. 2018, pp. 1-341.

(Continued)

*Primary Examiner* — Suhail Khan
(74) *Attorney, Agent, or Firm* — Nokia Technologies Oy

(57) ABSTRACT

One embodiment is directed to a method comprising receiving a conditional handover command; starting a timer; determining whether a condition for handover is fulfilled before the timer expires; and if the condition is fulfilled before the timer expires, connecting to a target cell and indicating to the target cell that the handover has been performed.

12 Claims, 4 Drawing Sheets

(56) References Cited

U.S. PATENT DOCUMENTS

2016/0345222 A1 11/2016 Axmon et al.
2018/0049078 A1* 2/2018 Yang ............... H04W 36/00837
2020/0022042 A1* 1/2020 Yin ....................... H04W 76/11

OTHER PUBLICATIONS

"Conditional Handover", 3GPP TSG-RAN WG2 #99-bis on NR, Tdoc R2-1710850, Agenda : 10.2.10, Ericsson, Oct. 9-13, 2017, pp. 1-5.

"Discussion on Conditional Handover Optimization", 3GPP TSG-RAN WG2#101, R2-1801784, Agenda : 10.2.7, Oppo, Feb. 26-Mar. 2, 2018, pp. 1-3.

"Ping Pong Issues for Conditional Handover", 3GPP TSG-RAN2#101, R2-1801935, Agenda : 10.2.7, TCL, Feb. 26-Mar. 2, 2018, 2 pages.

"Discussion on Conditional Handover in NR", 3GPP TSG-RAN WG2 Meeting #101, R2-1802008, Agenda : 10.2.7, ASTRI, Feb. 26-Mar. 2, 2018, pp. 1-6.

"Further Discussion on Conditional HO", 3GPP TSG-RAN2 Meeting #101, R2-1802472, Agenda : 10.2.7, Huawei, Feb. 26-Mar. 2, 2018, pp. 1-3.

"Introduction of Conditional Handover", 3GPP TSG-RAN2#101, R2-1802486, Agenda : 10.2.7, Samsung, Feb. 26-Mar. 2, 2018, 5 pages.

"Operational Aspects of Conditional Handover Mechanism", 3GPP TSG-RAN2#101, R2-1802487, Agenda : 10.2.7, Samsung, Feb. 26-Mar. 2, 2018, 4 pages.

"Support of DC based Handover with Conditional Handover for 0ms Interruption", 3GPP TSG-RAN WG2#101, R2-1802541, Agenda : 10.2.7, LG Electronics Inc., Feb. 26-Mar. 2, 2018, pp. 1-3.

"Conditional Handover Procedure", 3GPP TSG-RAN2#101, R2-1802693, Agenda : 10.2.7, LG Electronics Inc., Feb. 26-Mar. 2, 2018, pp. 1-3.

"Conditional Reconfiguration for NR", 3GPP TSG-RAN WG2 Meeting #101, R2-1802814, Agenda :10.2.7, InterDigital Communications, Feb. 26-Mar. 2, 2018, pp. 1-4.

"Discussion on Conditional Handover in NR", 3GPP TSG-RAN WG2 #101, R2-1803019, Agenda : 10.2.7, KT Corp., Feb. 26-Mar. 2, 2018, pp. 1-2.

"Conditional Handover in NR System", 3GPP TSG-RAN WG2 Meeting#101, R2-1803044, Agenda : 10.2.7, Lenovo, Feb. 26-Mar. 2, 2018, pp. 1-3.

"Conditional Handover", 3GPP TSG-RAN WG2 #101, R2-1803336, Agenda : 10.2.7, Ericsson, Feb. 26-Mar. 2, 2018, 6 pages.

"Conditional Handover-Simulation Results", 3GPP TSG-RAN WG2 #101, R2-1803337, Agenda : 10.2.7, Ericsson, Feb. 26-Mar. 2, 2018, 7 pages.

"On Reliability, Overhead and Controllability Aspects of Conditional Handover", 3GPP TSG-RAN WG2 #101, R2-1803338, Agenda : 10.2.7, Ericsson, Feb. 26-Mar. 2, 2018, 5 pages.

"On the Opportunities and Threats of NR Conditional Handover", 3GPP TSG-RAN WG2 Meeting #101, R2-1803343, Agenda : 10.2.7, Nokia, Feb. 26-Mar. 2, 2018, 4 pages.

"Configuration Management for Conditional Handover", 3GPP TSG-RAN WG2 Meeting #101, R2-1803347, Agenda 10.2.7, Nokia, Feb. 26-Mar. 2, 2018, 3 pages.

"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.

International Search Report and Written Opinion received for corresponding Patent Cooperation Treaty Application No. PCT/IB2019/053834, dated Jul. 25, 2019, 16 pages.

"Conditional Handover", 3GPP TSG-RAN WG2 #97, Tdoc R2-1700864, Agenda : 10.3.1.1.2, Ericsson, Jan. 13-17, 2017, pp. 1-5.

* cited by examiner

APPARATUS AND METHOD FOR OPTIMIZATION OF CONDITIONAL HANDOVER CONFIRMATION

RELATED APPLICATION

This application claims priority to PCT Application No. PCT/IB2019/053834, filed on May 9, 2019, which claims priority to Provisional Application No. 62/669,465, filed on May 10, 2018, each of which is incorporated herein by reference in its entirety.

CROSS-REFERENCE TO RELATED APPLICATIONS

This application claims priority to U.S. Provisional Patent Application No. 62/669,465 filed on May 10, 2018. The entire content of the above-referenced application is hereby incorporated by reference.

TECHNICAL FIELD

Some example embodiments may relate generally to an apparatus and a method for optimization of conditional handover confirmation.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. 5G or NR wireless systems refer to the next generation (NG) of radio systems and network architecture, and is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, high data rate, and long battery life. It is noted that, in 5G or NR, the nodes that can provide radio access functionality to a user equipment (i.e., similar to Node B in UTRAN or eNB in LTE) may be referred to as a next generation or 5G Node B (gNB). Conditional Handover (CHO) is a feature that is currently under consideration for next evolution of radio network systems. It is mainly considered for 5G/NR, which is under the responsibility of the $3^{rd}$ generation partnership project (3GPP).

SUMMARY

In general, example embodiments of the present disclosure provide a solution for contention resolution in random access procedure.

In a first aspect, there is provided an apparatus. The apparatus comprises at least one processor; and at least one memory including computer program codes; the at least one memory and the computer program codes are configured to, with the at least one processor, cause the apparatus to receive a conditional handover command; start a timer; determine whether a condition for handover is fulfilled before the timer expires; and if the condition is fulfilled before the timer expires, connect to a target cell and indicate to the target cell that the handover has been performed.

In a second aspect, there is provided a method. The method comprises receiving a conditional handover command; starting a timer; determining whether a condition for handover is fulfilled before the timer expires; and if the condition is fulfilled before the timer expires, connecting to a target cell and indicate to the target cell that the handover has been performed.

In a third aspect, there is provided an apparatus. The apparatus comprises means for receiving a conditional handover command; means for starting a timer; means for determining whether a condition for handover is fulfilled before the timer expires; and means for if the condition is fulfilled before the timer expires, connecting to a target cell and indicate to the target cell that the handover has been performed.

In a fourth aspect, there is provided an apparatus. The apparatus comprises circuitry configured to perform at least the method according to the second aspect.

In a fifth aspect, there is provided a non-transitory computer readable medium. The non-transitory computer readable medium comprises program instructions stored thereon, when executed in hardware, for performing at least the method according to the second aspect.

In a sixth aspect, there is provided a computer program product. The computer program produce comprises instructions for performing a process including at least the method according to the second aspect.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
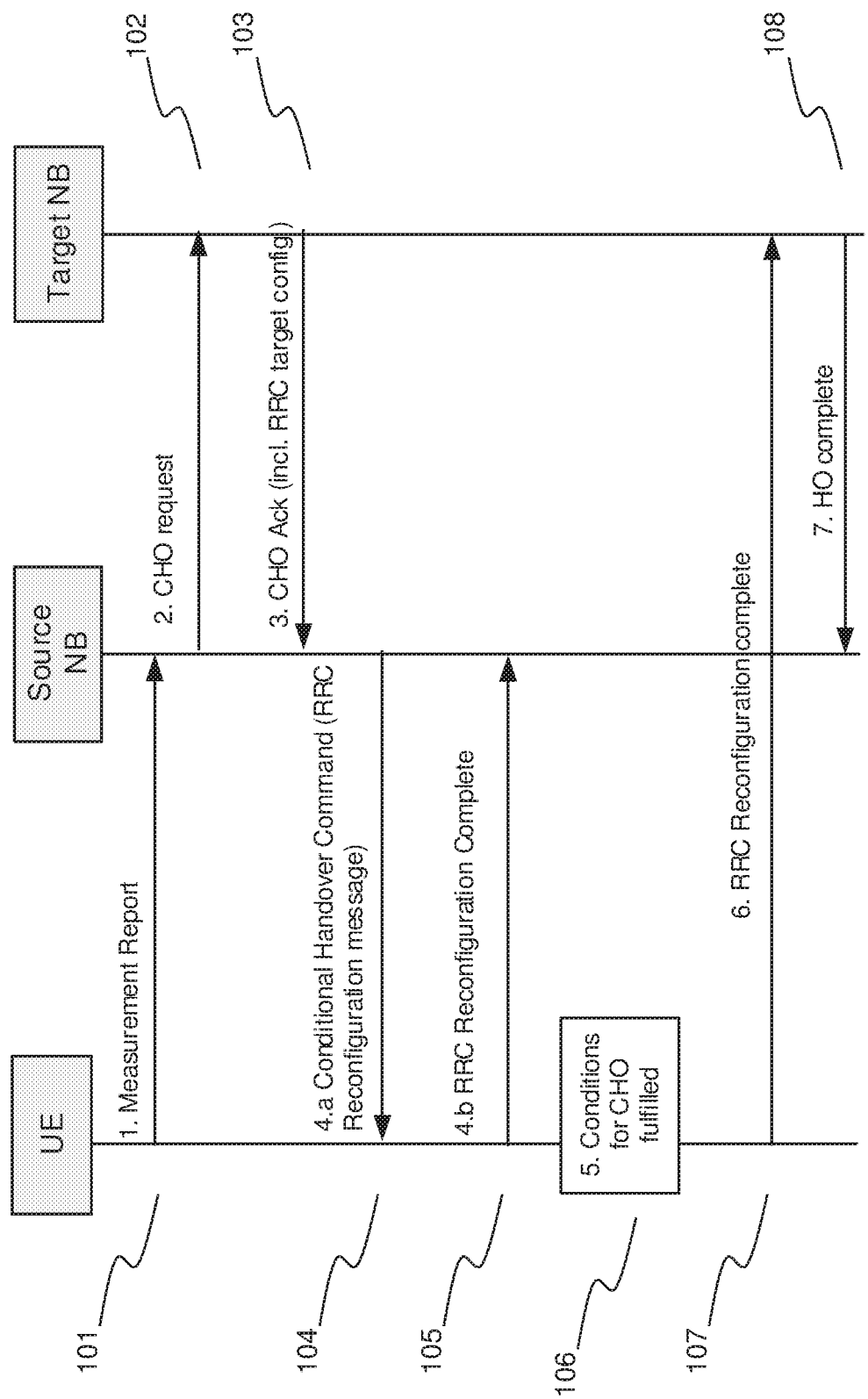
FIG. 1 illustrates a conditional handover (CHO) message flow in accordance with various example embodiments.

The description below generally refers to 5G NR terms, however this is not intended to be limiting. The description is equally applicable to other wireless networks and technologies. It will be also readily understood that the components of certain example embodiments, as generally described and illustrated in the figures herein, may be arranged and designed in a wide variety of different configurations. Thus, the following detailed description of some example embodiments of systems, methods, apparatuses, and computer program products, as represented in the attached figures and described below, is not intended to limit the scope of certain embodiments but is representative of selected example embodiments.

The features, structures, or characteristics of example embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in an example embodiment," "in some embodiments," "in other embodiments," or other similar language, throughout this specification do not necessarily all refer to the same group of embodiments, and the described features, structures, or characteristics may be combined in any suitable manner in one or more embodiments.

In a traditional handover (or basic handover, BHO), the process is usually triggered by a user equipment (UE) observing conditions that trigger a measurement report based on network configuration. The UE sends to a source Node B (NB) controlling a source cell a measurement report, which may point out a target cell, and normally, may indicate that this target cell has a better channel quality than the source cell. The source NB then may send a message to the NB controlling the target cell (target NB) for a handover preparation. This message usually carries the UE context that includes the data radio bearers (DRBs) that are used by the UE, the corresponding configuration for layer, like packet data convergence protocol (PDCP) layer, radio link control (RLC) layer, etc., and the radio configuration.

The target NB may reply with an acknowledgment which contains the certain configuration such as for example radio resource control (RRC) configuration that the UE will use when it accesses the target cell. This configuration may include a new configuration of the UE including radio configuration that should be used in target cell. The source NB then may send to the UE a handover command. In some example embodiments, the handover command may be included in a RRC reconfiguration message. After receiving the handover command, the UE may immediately establish connection to the target cell, without sending any confirmation message to the source NB. The UE may send a message such as for example, a RRC reconfiguration complete message to the target NB and applies the RRC configuration received in the handover command. The target NB then may inform the source cell that the handover was successful and the source cell can release the resources allocated to the UE.

On the other hand, in the case of conditional handover (CHO), after receiving a handover command, the UE will not immediately establish a connection to the target cell, but will wait until a given condition is met.

FIG. 1 illustrates a CHO message flow in accordance with various example embodiments. In an example embodiment of FIG. 1, a UE sends a measurement report to a source NB controlling a source cell at step 101. The report may indicate a target cell with a channel quality that makes the target cell a potential handover target, such as for example, the channel quality of the target cell being better than that of the source cell minus a given threshold. At step 102, the source NB sends a CHO request to the target NB controlling the target cell. The CHO request may contain the UE context. The target NB replies at step 103 with a CHO acknowledgement. This acknowledgement may include certain parameters such as for example RRC target configuration that the UE will use at the target cell.

At step 104, the source NB sends to the UE a CHO Command included in a RRC reconfiguration message. This message contains the RRC target configuration delivered by the target cell and optionally a condition for the CHO to be executed. At step 105, the UE sends a RRC reconfiguration complete message to the source NB to confirm the reception of the RRC reconfiguration message. The UE then waits for the conditions for CHO to be fulfilled and in the same time may continue communication with the source cell. At step 106, the condition for CHO is fulfilled. The condition may be for example that the target cell channel quality is above a threshold or better than the channel quality of the source cell plus or minus a threshold. Then the UE connects to the target cell, and sends another RRC reconfiguration complete message to the target cell at step 107. At step 108, the target NB informs the source NB that the CHO was successful.

In the case of CHO, the UE can quickly perform the HO when the radio conditions are met, as some of the preparation messages between the source cell and the target cell has already been exchanged. In BHO, there are messages exchanged between UE and source cell and between source NB and target NB that slow down the process when the handover parameters are met.

In the case of CHO, when the UE waits for the conditions for CHO to be fulfilled, the configuration of the UE may change. The network may have to send another RRC reconfiguration message to change the UE configuration. This could happen for example if a voice call is terminated so that the network needs to de-configure the associated DRBs. This mean that the network needs to know what the UE RRC configuration is and thus needs to know if the UE has received and implemented the RRC reconfiguration message that contained the CHO command. Note that the RRC reconfiguration message could also contain other reconfiguration not related to the CHO, for example an update on the radio configuration or a change of configuration of the layers like PDCP, RLC, etc.

If the UE fails to send the RRC reconfiguration complete message at step 105 because of bad radio condition, the UE will try to reconnect to the network, but then there is some uncertainty about the UE configuration because the network does not know whether the last RRC reconfiguration message has been implemented or not. Because of this uncertainty, the network usually rejects the UE reconnection and send it to idle mode. This may delay the execution of CHO. Especially, if the CHO command (included in the RRC Reconfiguration message) is sent late, it is possible that the condition to trigger the execution of the CHO is immediately met. In this case, the UE will not perform the CHO if it can't send the RRC reconfiguration complete message even if the condition to execute the CHO is met. That means the UE will lose time because of trying to send the RRC reconfiguration complete message instead of executing the CHO to the target cell. On the other hand, the UE also may have difficulties to send the RRC reconfiguration complete message leading to call drop as described above. Therefore, a scheme for conditional handover confirmation optimization may be needed.

In an example embodiment, when the UE is configured for CHO and the condition to execute the CHO is immediately met, or met within a given time, the UE does not send an acknowledge message, such as for example RRC reconfiguration complete message, to the source cell, but executes the CHO and sends a message to the target cell. If the condition to trigger the CHO is not met within a given time, the UE may send an acknowledge message to the source cell.

Figure 2:
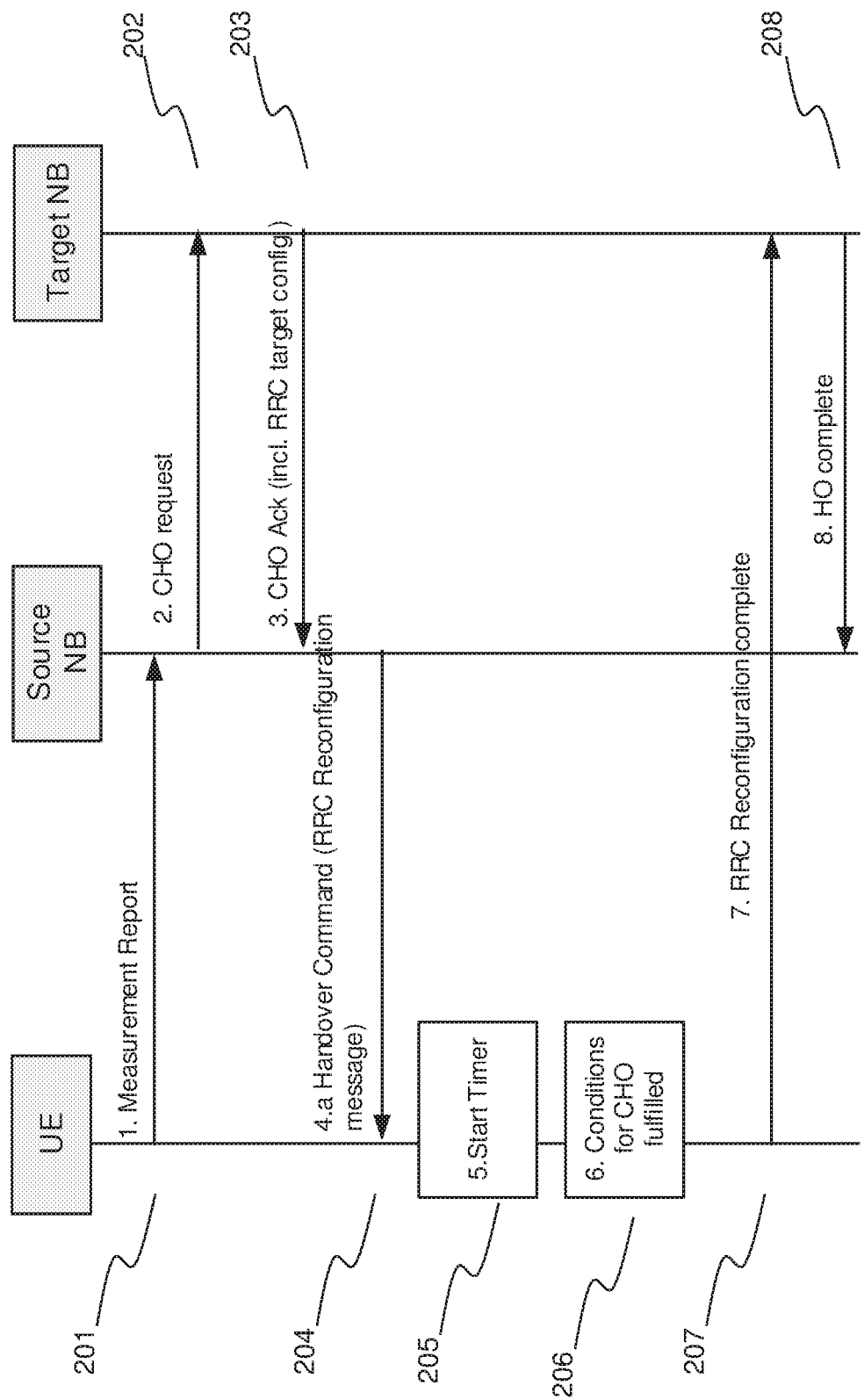
FIG. 2 illustrates a CHO message flow with a timer in accordance with various example embodiments.

FIG. 2 illustrates a CHO message flow with a timer in accordance with various example embodiments. In an example embodiment of FIG. 2, a UE sends a measurement report to a source NB controlling a source cell at step 201. The report may indicate a target cell with a channel quality that makes the target cell a potential handover target, such as for example, the channel quality of the target cell being better than that of the source cell minus a given threshold. At step 202, the source NB sends a CHO request to the target NB controlling the target cell. The CHO request may contain the UE context. The target NB replies at step 203 with a CHO acknowledgement. This acknowledgement may include certain parameters such as for example RRC target configuration that the UE will use at the target cell.

At step 204, the source NB sends to the UE a CHO Command included in a RRC reconfiguration message. This message contains the RRC target configuration delivered by the target cell and optionally a condition for the CHO to be executed. At step 205, the UE starts a timer and waits for the conditions for CHO to be fulfilled. In the same time the UE may continue communication with the source cell. At step 206, the condition for CHO is fulfilled before the timer expires. The condition may be for example that the target cell channel quality is above a threshold or better than that of the source cell plus or minus a threshold. Then the UE connects to the target cell, and sends a RRC reconfiguration complete message to the target cell at step 207. At step 208, the target NB informs the source NB that the CHO was successful.

Figure 3:
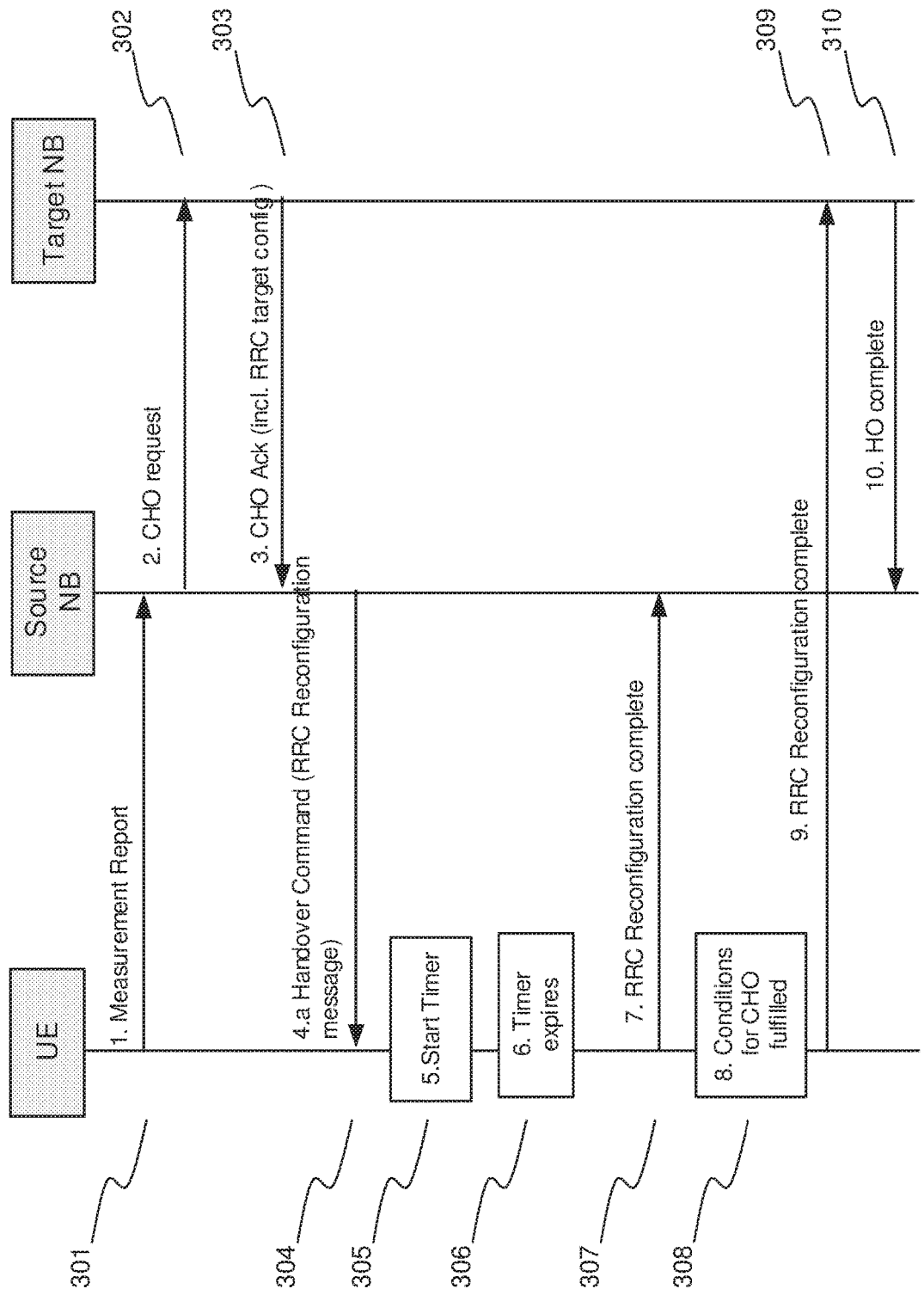
FIG. 3 illustrates another CHO message flow with a timer in accordance with various example embodiments.

FIG. 3 illustrates another CHO message flow with a timer in accordance with various example embodiments. In an example embodiment of FIG. 3, a UE sends a measurement report to a source NB controlling a source cell at step 301. The report may indicate a target cell with a channel quality that makes the target cell a potential handover target, such as for example, the channel quality of the target cell being better than that of the source cell minus a given threshold. At step 302, the source NB sends a CHO request to the target NB controlling the target cell. The CHO request may contain the UE context. The target NB replies at step 303 with a CHO acknowledgement. This acknowledgement may include certain parameters such as for example RRC target configuration that the UE will use at the target cell.

At step 304, the source NB sends to the UE a CHO Command included in a RRC reconfiguration message. This message contains the RRC target configuration delivered by the target cell and optionally a condition for the CHO to be executed. At step 305, the UE starts a timer and waits for the conditions for CHO to be fulfilled. In the same time the UE may continue communication with the source cell. At step 306, the timer expires before the condition for CHO is met. The UE then sends a RRC reconfiguration complete message to the source cell to confirm the reception of the RRC reconfiguration message at step 307. At step 308, the condition for CHO is fulfilled. The condition may be for example that the target cell channel quality is above a threshold or better than that of the source cell plus or minus a threshold. Then the UE connects to the target cell, and sends another RRC reconfiguration complete message to the target cell at step 309. At step 310, the target NB informs the source NB that the HO was successful.

In an example embodiment, the timer may be configured based on cell load or measurement result of source cell or/and target cell. It may be derived from CHO success rate from source cell to target cell, or may be derived from the number of radio link failures that happen during CHO from source to target cell. In an example embodiment, the start of the timer may be conditioned by the channel quality level of the serving cell, the target cell or the difference of the two. For example, if the UE is far from the target cell so that the channel quality level of the target is way below the source cell, there may be no need to trigger the timer and the UE can send a RRC reconfiguration complete message immediately to the source cell.

Figure 4:
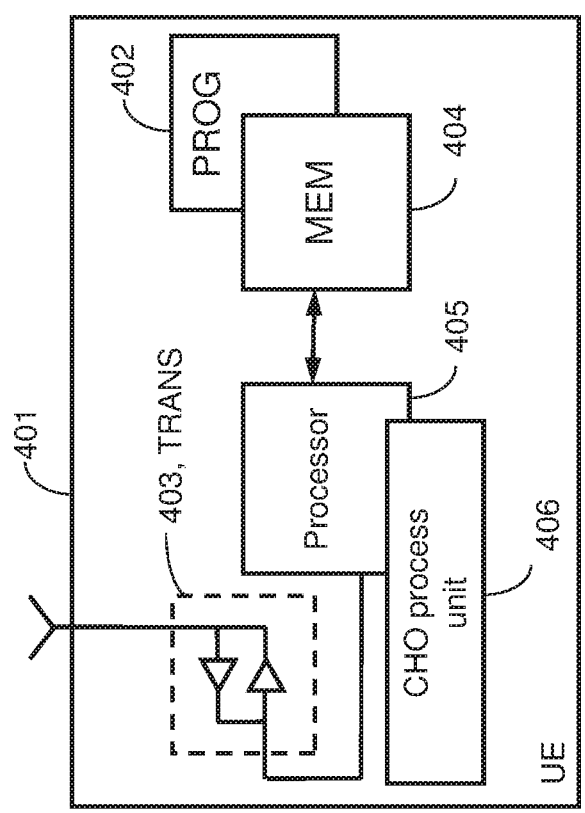
FIG. 4 illustrates a simplified block diagram of an example apparatus that is suitable for use in practicing various example embodiments of this application.

Reference is made to FIG. 4 for illustrating a simplified block diagram of an example apparatus that is suitable for use in practicing various example embodiments of this application. In FIG. 4, a user equipment, UE, 401, is adapted for communication with other network entity, which is not shown for brevity. The UE 401 includes at least one processor 405, at least one memory (MEM) 404 coupled to the at least one processor 405, and a suitable transceiver (TRANS) 403 (having a transmitter (TX) and a receiver (RX)) coupled to the at least one processor 405. The at least one MEM 404 stores a program (PROG) 402. The TRANS 403 is for bidirectional wireless communications with other network entity.

The UE 401 may further include a CHO process unit 406. The unit 406, together with the at least one processor circuitry 405 and the PROG 402, may be utilized by the UE 401 in conjunction with various example embodiments of the application, as described herein.

In general, the various example embodiments of the apparatus 401 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, internet appliances permitting wireless internet access and browsing, as well as portable units or terminals that incorporate combinations of such functions.

In some example embodiments, the UE 401 may include one or more processors, one or more computer-readable storage medium (for example, memory, storage, or the like), one or more radio access components (for example, a modem, a transceiver, or the like), and/or a user interface. In some embodiments, the UE 401 may be configured to operate using one or more radio access technologies, such as GSM, LTE, LTE-A, NR, 5G, WLAN, narrow band IoT, Bluetooth, near field communication (NFC), MulteFire, and/or any other radio access technologies. It should be noted that one of ordinary skill in the art would understand that UE 401 may include components or features not shown in FIG. 4, such as for example, an input and/or output device (I/O device), or a user interface, such as a graphical user interface or touchscreen.

The PROGs 402 is assumed to include program instructions that, when executed by the associated processor, enable the electronic apparatus to operate in accordance with the example embodiments of this disclosure, as discussed herein.

The example embodiments of this disclosure may be implemented by computer software or computer program code executable by one or more of the processor circuitries 405 of the UE 401, or by hardware, or by a combination of software and hardware.

The MEM 404 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processor circuitry 405 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be to allow a source cell to know the state of a UE and possibly reconfigure it if needed during a conditional handover procedure. Another technical effect may be a prompt execution of CHO upon the fulfillment of condition without delay, therefore minimizing call drop.

Embodiments of the present invention may be implemented in software, hardware, application logic or a combination of software, hardware and application logic. The software, application logic and/or hardware may reside on an apparatus such as a user equipment, a gNB or other mobile communication devices. If desired, part of the software, application logic and/or hardware may reside on a network element, part of the software, application logic and/or hardware may reside on a UE 401, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a non-transitory computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention.

Further, the various names, such as for example, the names of channels or messages used for illustration are not intended to be limiting in any respect, as they may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

According to a first embodiment, a method may include receiving a conditional handover command; starting a timer; determining whether a condition for handover is fulfilled before the timer expires; and if the condition is fulfilled before the timer expires, connecting to a target cell and indicating to the target cell that the handover has been performed.

In a variant, if the timer expires before the condition is fulfilled, indicating to a serving cell that the conditional handover command has been received.

In a further variant, the conditional handover command includes the condition for the handover to be executed.

In a further variant, the timer is started only if the channel quality of source cell, target cell or both fulfill certain condition.

According to a second embodiment, an apparatus can include at least one processor and at least one memory and computer program code. The at least one memory and the computer program code can be configured to, with the at least one processor, cause the apparatus at least to perform a method according to the first embodiment, and any of its variants.

According a third embodiment, an apparatus can include means for performing the method according to the first embodiment, and any of its variants.

According to a fourth embodiment, a computer program product may encode instructions for performing a process including a method according to the first embodiment, and any of its variants.

According to a fifth embodiment, a non-transitory computer-readable medium may encode instructions that, when executed in hardware, perform a process including a method according to the first embodiment, and any of its variants.

According to a sixth embodiment, a computer program code may include instructions for performing a method according to the first embodiment, and any of its variants.

I claim:

1. A method, comprising:
   receiving a conditional handover command;
   starting a timer;
   determining whether a condition for handover is fulfilled before the timer expires;
   if the condition is fulfilled before the timer expires, connecting to a target cell and indicating to the target cell that the handover has been performed; and
   if the timer expires before the condition is fulfilled, indicating to a serving cell that the conditional handover command has been received.

2. The method of claim 1, further comprising:
   if the condition is fulfilled after the timer expires, connecting to a target cell and indicating to the target cell that the handover has been performed.

3. The method of claim 1, wherein the conditional handover command includes a condition for the handover to be executed.

4. The method of claim 1, wherein the timer is started only if the channel quality of the source cell, the target cell or both fulfill certain condition.

5. An apparatus, comprising:
   at least one processor; and
   at least one memory comprising computer program code,
   wherein the at least one memory and the computer program code are configured, with the at least one processor, to cause the apparatus at least to:
   receive a conditional handover command;
   start a timer;
   determine whether a condition for handover is fulfilled before the timer expires;
   if the condition is fulfilled before the timer expires, connect to a target cell and indicate to the target cell that the handover has been performed; and
   if the timer expires before the condition is fulfilled, indicate to a serving cell that the conditional handover command has been received.

6. The apparatus of claim 5, wherein the at least one memory and computer program code are configured, with the at least one processor, to cause the apparatus further to:
   if the condition is fulfilled after the timer expires, connect to a target cell and indicate to the target cell that the handover has been performed.

7. The apparatus of claim 5, wherein the conditional handover command includes the condition for the handover to be executed.

8. The apparatus of claim 5, wherein the timer is started only if the channel quality of the source cell, the target cell or both fulfill certain condition.

9. A non-transitory computer readable medium comprising program instructions stored thereon, when executed in hardware, for performing at least:
   receiving a conditional handover command;
   starting a timer;
   determining whether a condition for handover is fulfilled before the timer expires;
   if the condition is fulfilled before the timer expires, connecting to a target cell and indicating to the target cell that the handover has been performed; and
   if the timer expires before the condition is fulfilled, indicating to a serving cell that the conditional handover command has been received.

10. The computer readable medium of claim 9, wherein the program instructions, when executed in hardware, for further performing:
    if the condition is fulfilled after the timer expires, connecting to a target cell and indicating to the target cell that the handover has been performed.

11. The computer readable medium of claim 9, wherein the conditional handover command includes a condition for the handover to be executed.

12. The computer readable medium of claim 9, wherein the timer is started only if the channel quality of the source cell, the target cell or both fulfill certain condition.

\* \* \* \* \*